No. 720,578. PATENTED FEB. 17, 1903.
E. T. GREENFIELD.
PIPE COUPLING.
APPLICATION FILED APR. 14, 1902.
NO MODEL.
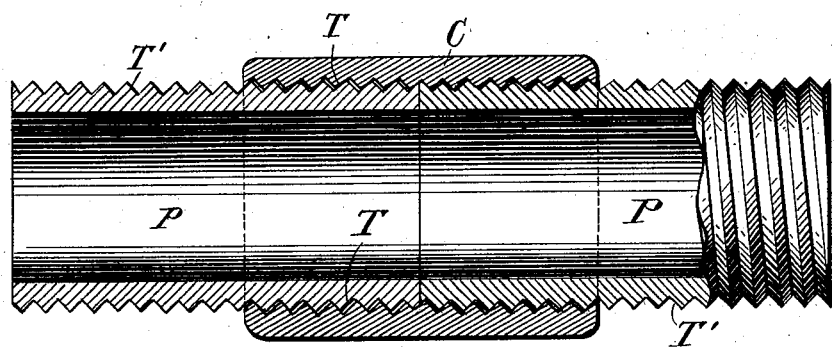

UNITED STATES PATENT OFFICE.

EDWIN T. GREENFIELD, OF MONTICELLO, NEW YORK.

PIPE-COUPLING.

SPECIFICATION forming part of Letters Patent No. 720,578, dated February 17, 1903.

Application filed April 14, 1902. Serial No. 102,848. (No model.)

*To all whom it may concern:*

Be it known that I, EDWIN T. GREENFIELD, a citizen of the United States, residing at Monticello, in the county of Sullivan and State of New York, have made a new and useful Invention in Pipe-Couplings, of which the following is a specification.

My invention is directed to improvements in means for connecting metal or other pipes together and in such manner as to effect a steam or gas tight joint between the same.

Much difficulty is found in the making of steam or gas tight joints between the adjoining ends of screw-threaded pipes when connected together by a screw-threaded coupler. It has been customary heretofore to accomplish this result by truing the ends of the pipes and then securing the screw-threaded ends thereof into absolute frictional contact with each other in a surrounding uniting screw-threaded coupler with such force as to make practically a gas-tight joint between the trued ends of the pipes. There are places, however, in the arts where it is not always possible to thus true the ends of pipes—such, for instance, as in buildings where pipes are cut and screw-threaded at the time they are placed in final position. It has also been customary to effect the result sought by giving to the outer surfaces of the adjoining ends of the screw-threaded pipes a slightly-conical shape, so as to thus cause the screw-threaded coned parts to bind upon the screw-threads of the coupler, so that the binding-faces of the screw-threads thus accomplish what was before accomplished in the manner above described. My invention is designed to accomplish this result in a much more perfect manner, and I arrive at the same by combining with the screw-threaded ends of the pipes a surrounding screw-threaded coupler in which the pitch of the threads is uniform throughout the length of the coupler, but varies from the pitch of the threads throughout the lengths of the screw-threaded ends of the pipes.

My invention will be understood by referring to the accompanying drawing, which represents the adjoining ends of two pieces of pipe or tube in section and a surrounding coupler constructed in accordance with my improvement, one end of one of the pipes being shown in elevational view for the purpose of illustrating fully the screw-threads thereof.

P P represent the adjoining ends of two such screw-threaded pipes, in which the screw-threads T' are cut, a definite number or pitch to the inch—say ten and three-quarters—and C represents a surrounding coupler similarly screw-threaded internally, the number or pitch of the screw-threads T, however, varying per inch from the number indicated upon the adjoining ends of the pipes P—say ten and one-half per inch. With such an arrangement I find that when the adjoining ends of the pipes are secured to the coupler C the threads thereof gradually bind upon the faces of the corresponding screw-threads in the coupler until there is a binding effect between the outer faces of the screw-threads of the pipes and the inner faces of the screw-threads of the coupler, as shown. In other words, there is a binding effect throughout the complete lengths of the screw-threads as between the outer and inner faces thereof of the entire length of the coupler, so that it matters not whether the adjoining ends of the pipes P fit snugly against each other.

I do not limit my invention to any particular difference or ratio with relation to the number or pitch of the screw-threads on the inner surface of the coupler and on the outer surfaces of the adjoining ends of the pipes. However, I have obtained in practice the best results by making this ratio or the difference in pitch comparatively small. I find that I obtain good results with one-inch pipes and a coupler in which the screw-threads upon the ends of the pipes are, say, ten and three-quarters per inch and within the inner surface of the coupler, say, ten and one-half per inch. It is obvious that the relative ratio of the screw-threads in the coupler and on the pipes might be reversed—that is to say, the screw-threads within the coupler might be, say, ten and three-quarters per inch and those upon the adjoining ends of the pipes, say, ten and one-half per inch—the essential feature of novelty of my invention lying in the relative variation of the number or pitch of the screw-threads within the coupler and upon the outer surfaces of the adjoining ends of the pipes. It is also obvious that the coupler might be provided with exterior screw-threads, the pipes having interior screw-threads at their ends, and the relative ratio of said screw-threads varied, as above indicated; nor do I limit my invention to its use as a pipe-coupler, as obviously the same result might be effected for a pipe head or cap where it is desired to effect a steam or gas tight joint at the end of a pipe or tube when the thread has a definite pitch.

Having thus described my invention, what I claim, and desire to secure by Letters Patent of the United States, is—

1. Means for effecting a tight joint at the end of a pipe, consisting of a screw-threaded surrounding part and a screw-threaded end upon the pipe, the pitch of the threads being uniform throughout the length of the screw-threaded portion of the surrounding part; the pitch of the threads of the pipe being also uniform throughout the length of the screw-threaded portion thereof but differing from that of the screw-threads of the surrounding part, substantially as described.

2. Means for effecting a tight joint between the ends of two adjoining pipes, consisting of a screw-threaded coupler and screw-threaded ends upon the pipes, the pitch of the threads of the coupler being uniform throughout the length of the screw-threaded portion thereof; the pitch of the threads of the pipes being also uniform throughout the screw-threaded portion thereof but differing from that of the screw-threads of the coupler, substantially as described.

3. Means for effecting a tight joint between the ends of two adjoining pipes, consisting of an internal screw-threaded coupler and screw-threads upon the adjoining ends of the pipes; the pitch of the threads of the coupler being uniform throughout the length of the screw-threaded portion thereof; the pitch of the threads of the pipes being also uniform throughout the screw-threaded portion thereof but differing from that of the screw-threads of the coupler, substantially as described.

4. A screw-threaded coupler, the threads of which have a uniform pitch throughout its length; in combination with two pipes adapted to be connected to the coupler and having their ends screw-threaded, said threads having a uniform pitch throughout the length thereof but differing from that of the screw-threads of the coupler, substantially as described.

In testimony whereof I have signed my name to this specification in the presence of two subscribing witnesses.

EDWIN T. GREENFIELD.

Witnesses:
C. J. KINTNER,
M. F. KEATING.